April 14, 1970     H. KOCH ET AL     3,506,140

APPARATUS FOR HANDLING EGGS

Filed June 21, 1968     2 Sheets-Sheet 1

Inventors:
Heinrich Koch
Kurt Hermsmeyer
By Spencer & Kaye
Attorneys

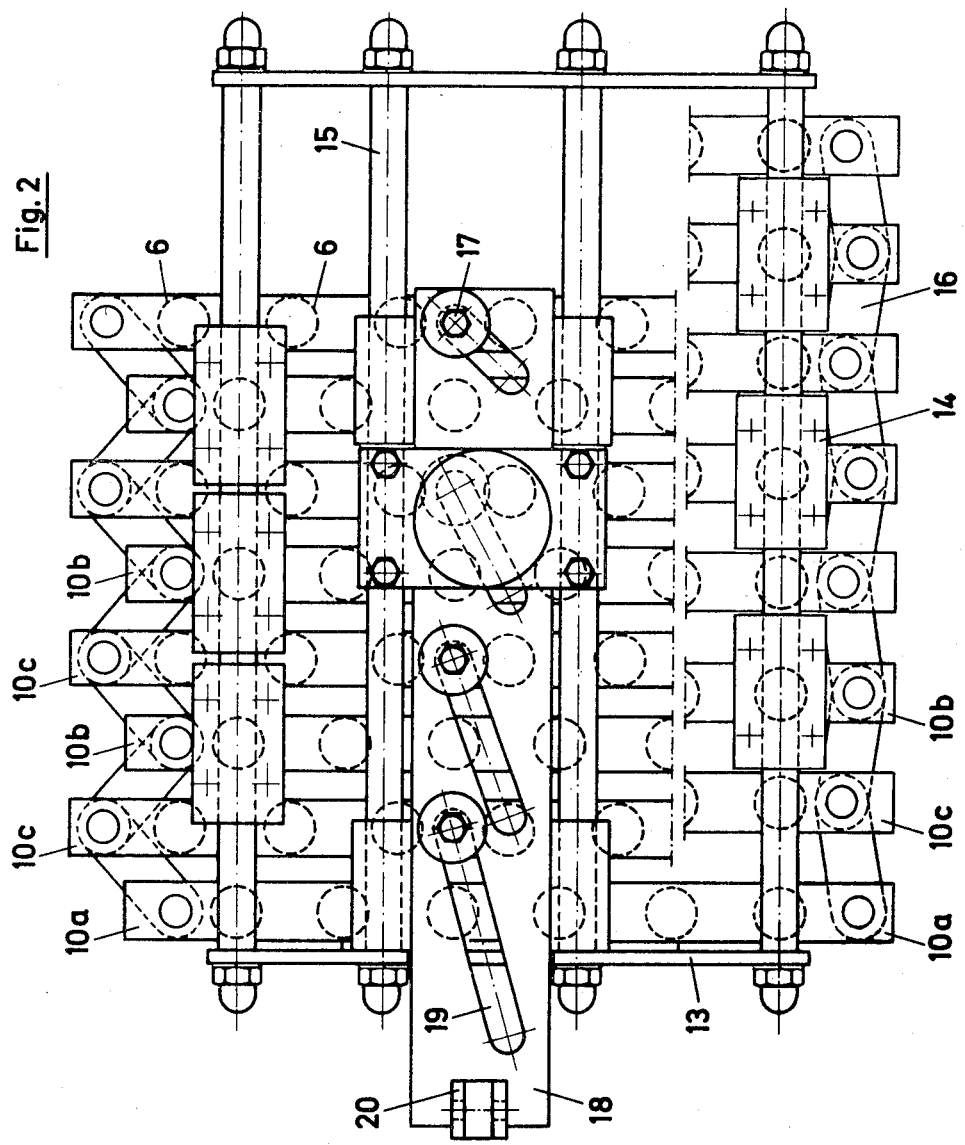

United States Patent Office 3,506,140
Patented Apr. 14, 1970

3,506,140
APPARATUS FOR HANDLING EGGS
Heinrich Koch, Bad Salzuflen, and Kurt Hermsmeyer, Obernbeck, Germany, assignors, by mesne assignments, to Paul R. Kuhl, Sr., and Henry Y. Kuhl
Filed June 21, 1968, Ser. No. 739,022
Int. Cl. B65b 23/08; B66c 1/02
U.S. Cl. 214—1
11 Claims

ABSTRACT OF THE DISCLOSURE

Method and apparatus for removing eggs from a transport container in which the eggs are in mutually perpendicular rows into an incubation tray in which the eggs are tightly packed. The eggs are staggered while they are being transferred from the transport container to the incubation tray, this being done by means of rows of suction cups, alternate rows being displaced so that the field of suction cups can be changed from one wherein the suction cups are in mutually perpendicular rows to a field in which the cups are staggered.

BACKGROUND OF THE INVENTION

Eggs intended for hatching purposes are generally supplied in transport cardboard trays which have recesses forming rows at right angles to one another. The eggs must then be taken out of these transport trays and arranged in the incubation trays. For the sake of convenience, it is usual to arrange the incubation trays obliquely at an angle of about 25° and to place the eggs in them close together in staggered relationship so that they support one another with mutual contact. When the incubation trays are completely full, they can easily be transported even lying flat because there is no longer any risk of the eggs tipping over.

The transfer of the eggs from the transport trays into the incubation trays has hitherto generally been effected by tedious manual labor which, in addition, requires a great deal of time. A known improvement was achieved merely by using two suction lifters, the arrangement of the suction cups in the one corresponding to the position of the eggs in the transport trays and the arrangement of the suction cups in the other corresponding to the close and staggered arrangement of the eggs in the incubation trays. In addition, a separate shift plate as an intermediate member was also necessary in which the eggs taken from the transport trays by means of the first suction lifters were inserted in order to be brought into staggered relationship by actuation of a separate mechanism. Then the eggs had to be picked up again by the second lifter and deposited in the incubation frames. Although this process leads to a certain acceleration of the operation, nevertheless in the long run it was still not entirely satisfactory. Accordingly, it is the object of the invention to provide a method for the mechanical filling of incubation frames whereby it is possible to manage without any intermediate stage and hence without the necessity of putting down the eggs again.

SUMMARY OF THE INVENTION

As a solution to the problem stated, there is provided a method and apparatus wherein the eggs in the transport trays are first lifted by a suction lifter, then staggered by a displacement of the suction cups of the suction lifter, next swung over the incubation frame intended to receive the eggs which are finally deposited into the frame.

It is also an object of the invention to provide a device whereby the above method can be carried out in a satisfactory manner.

The most important constructional features of such a device consist in that a horizontal supporting table, adapted to receive the transport trays, is mounted in front of a supporting surface inclined at about 25° for holding the incubation trays, and that above these devices a suction lifter equipped with suction cups is arranged to be reciprocated in a vertical plane in such a manner that, at the beginning of each cycle of operation, it is lowered onto the eggs standing in the transport tray, grips them with its suction cups and conveys them in an arcuate swivelling motion into the incubation trays, the suction cups, which were originally aligned in rows, assuming a staggered relationship during this arcuate motion so that the eggs, when entering the incubation frame, are tightly packed when they are released by the suction lifter.

In a further development, it is an advantage to attach the suction cups of the suction lifter, the number and distribution of which corresponds to the recesses in the transport trays, used, to a plurality of tubes which extend in the swivelling direction of the suction lifter and which are each connected to vacuum pipelines, one external tube being rigidly connected to the supporting structure whereas every alternate tube is mounted on cross bars of the supporting structure for displacement through sliding members, and the free tubes extending in between are connected to the other tubes, preferably at their ends, by means of horizontal articulated levers connected in series in a zig-zag formation. It also contributes to the advantageous construction of the suction lifter if the free tubes which are guided by the said articulated levers, are suspended in their central regions by means of vertical pins from a plate lying flat on the supporting structure, the pins penetrating through inclined slots in the plates, and if a setting lever, which is capable of varying the spacing of the tubes while displacing them at the same time as a result of displacement of the plate, acts as a bearing point of this plate.

The suction lifter may be connected in a conventional manner to a mechanically, hydraulically or pneumatically actuated swivel arm which is mounted at the side thereof on the machine frame and which not only imparts to the suction lifters the reciprocating motions between the transport trays to be emptied and the incubation frames but also carries the setting lever causing the variations in the spacing of the suction cups.

The device according to the invention is also intended to bring the incubation trays to be filled into position automatically and for this reason the supporting surface for the incubation trays has horizontal guide rails, and conveyor chains arranged parallel to the rails whereby the incubation trays can be successively displaced in the plane of movement of the suction lifter. Furthermore, for the complete mechanization of all the operations it is essential to provide the supporting surface with further guide rails and conveyor chains in the plane of movement of the suction lifter, the purpose of these being to displace the incubation trays upwards and downwards underneath the suction lifter as their filling progresses because a plurality of cycles of operation of the suction lifter are necessary for the complete filling of an incubation frame.

Finally, appropriate control devices should be provided to ensure that the movements of all the motor-driven parts mentioned above take place in synchronism in a pre-determined rhythm.

BRIEF DESCRIPTION OF THE DRAWINGS

FIGURE 2 is the plan view of the suction lifter of the device shown in FIGURE 1.

DESCRIPTION OF THE PREFERRED METHOD AND EMBODIMENT

Figure 1:
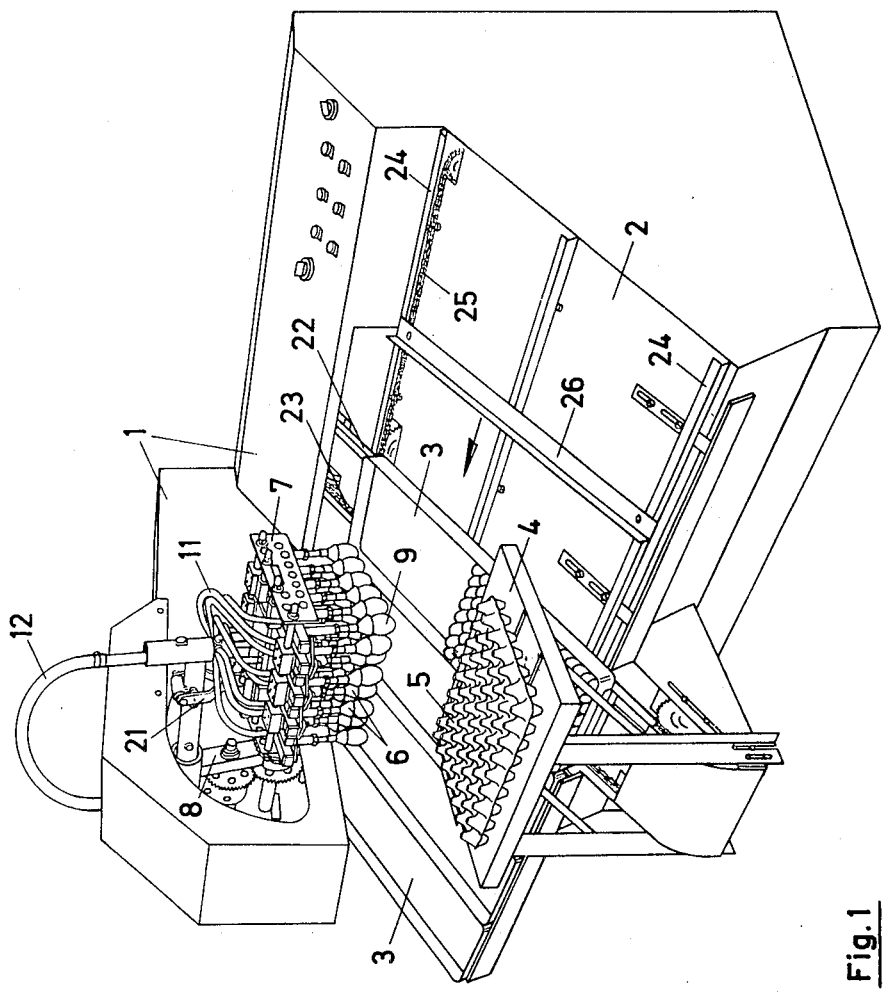
FIGURE 1 shows the perspective front view of a device for filling incubation trays, according to the invention.

As shown in FIGURE 1, the front of the machine frame 1 of the device forms a supporting surface 2 which is inclined at an angle of about 25° and serves to receive the incubation trays 3. A horizontal supporting table 4 for the transport trays 5 is mounted in front of the supporting surface 2. Above the supporting surface 2 and the supporting table 4 is a lifting means, suction lifter 7, which is equipped with grasping means, suction cups 6, and which is connected to a conveying means, swivel arm 8. The latter is mounted laterally on the machine frame or supporting means 1 and is driven by means of a chain drive not visible in the drawing. The suction lifter 7 can therefore reciprocate in a vertical plane between the supporting table 4 and the supporting surface 2, and rearrange the eggs 9 from the transport trays 5 in the incubation frames 3 in a manner to be described in more detail hereinafter.

The particular construction of the suction lifter 7 also includes staggering means which can be seen most clearly from FIGURE 2. Like the transport trays used, it has a total of 48 suction cups 6 which are secured in rows of 6 cups each to tubes 10. As shown in FIGURE 1, tubes 10 extend in the swivelling direction of the suction lifter 7 and are each connected to vacuum pipelines 11 which in turn lead to a main vacuum pipe 12. Unlike the other tubes 10b and 10c, the outside tube 10a, on the left in FIGURE 2, is rigidly connected to the supporting structure 13 so that it cannot vary its position in relation thereto. Every other alternate tube 10b on the other hand, is mounted through sliding members 14 on cross bars 15 of the supporting structure 13 for displacement and the free tubes 10c extending between them are connected at their ends to the tubes 10a and 10b through horizontal articulated levers 16 connected in series in a zigzag formation. In addition, the free tubes 10c, which are guided by the articulated levers 16, are suspended in their central region by means of vertical pins 17 from a plate 18 lying flat on the supporting structure 13. For this purpose, it has inclined slots 19 in which the pins 17 engage.

The purpose of all the means discussed so far consists in that the position of the suction cups 6, illustrated in the lower part of FIGURE 2, can be varied or staggered with simultaneous displacement of the eight parallel rows formed thereby, as a result of a lateral movement of the plate 18, in such a manner that not only is the spacing between the tubes 10 reduced, but each of the free tubes 10c is also displaced in the direction of its longitudinal axis. In this manner, the suction cups 6 assume the position of the eggs 9 when they are arranged in rows at right angles to one another in the transport trays 5, while, after the displacement of the plate 18 and hence of the tubes 10c, the suction cups 6 are closely arranged in staggered relationship as desired for the eggs after they have been inserted in the incubation trays 3.

In order that the displacement movement of the suction cups 6 may take place automatically, a setting lever 21, which can be seen in FIGURE 1, acts on a bearing point 20 of the plate 18, which lever 21 is carried by the swivel arm 8 which, in addition, actuates it from a swashplate situated at the rear.

The actual operation of filling the incubation trays 3 lying on the inclined supporting surface 2 takes place in such a manner that first a transport tray 5 filled with eggs 9 is placed on the supporting table 4 and then the suction lifter 7 is lowered onto it. The suction cups 6 are arranged in rows corresponding to the recesses in the transport tray 5 and pick up the eggs 9 by suction as soon as these come within the influence of the vacuum. Then the suction lifter 7 together with the eggs 9 is raised by the swivel arm 8 along a curved path and travels over the supporting surface 2. During this action, the setting lever 21 is operated and displaces the suction cups 6 in such a manner that they are brought into staggered relationship. Only then, through interruption in its vacuum action, does the suction lifter 7 deposit the eggs 9 suspended therefrom in the incubation trays 3 where, as a result of their tight packing, they support one another and protect each other from falling over. Then the suction lifter 7 returns to the supporting table 4 where it empties a transport tray 5 which has been freshly delivered in the meantime.

A plurality of operating cycles of the suction lifter 7 are necessary for each incubation tray 3 because, on the first action, it can only fill the lower portion of the incubation tray 3. For this purpose, the latter must be adapted for a reciprocating movement in its longitudinal direction on guide rails 22 and this is made possible by means of the conveyor chains 23 extending on the supporting surface 2 in the plane of movement of the suction lever 7. The advancing of the empty incubation tray 3 into the plane of movement of the suction lever is also carried out mechanically in the present example, and for this purpose, in addition to the horizontal guide rails 24 for the incubation trays 3, two further conveyor chains 25 are provided.

As in the case of the conveyor chains 23, a cross member 26 is connected to the conveyor chains whereby the incubation trays 3 are pushed on in the direction of the arrow as soon as one of them is filled.

All the movements to be carried out by motor-driven parts of the device according to the invention are supervised by control devices which ensure that the individual operations take place in synchronism in a predetermined rhythm.

Other forms of construction of the device described are perfectly conceivable both with regard to the configuration of the suction lifter 7 and with regard to its drive which might possibly be pneumatic or hydraulic, and should be included within the scope of protection of the invention claimed.

The technical progress achieved by the invention is to be seen primarily in that, as a result of the new method developed, it is possible to effect the filling of incubation frames with eggs deliverd in transport trays completely mechanically whereas previously this work had to be carried out much more slowly and more expensively by hand. Furthermore, the eggs which represent very sensitive transport goods are treated with much greater care in that they are now picked up by one suction lifter and passed directly into the incubation trays in a single lifting movement.

It will be understood that the above description of the present invention is susceptible to various modifications, changes, and adaptations.

We claim:

1. Apparatus for handling eggs comprising in combination:
    (a) a horizontal supporting table adapted to receive thereon first egg carrying means in which the eggs are positioned in mutually perpendicular rows;
    (b) an inclined supporting surface adapted to receive second egg carrying means and located on one side of said supporting table;
    (c) lifting means mounted for reciprocating movement in a vertical plane, said lifting means being positioned over said supporting table and surface and including:
        (1) means for grasping the eggs in the first carrying means, and
        (2) means for staggering the eggs while the same are being conveyed in consequence of which the eggs are tightly packed in said second carrying means when released by said lifting means; and
    (d) mechanical conveying means connected to said lifting means for automatically conveying it over a predetermined path between said first and second carrying means.

2. Apparatus as defined in claim 1 wherein said supporting surface is inclined at an angle of about 25° with respect to said supporting table.

3. Apparatus as defined in claim 2 wherein said grasping means comprise a plurality of suction cups.

4. Apparatus as defined in claim 3 wherein the number of said plurality of suction cups provided corresponds to the number of egg accommodating recesses provided in the first carrying means being used and wherein said egg conveying means move along an arcuate path; said lifting means including a supporting frame, a plurality of tubes extending in the direction of the arcuate path of said lifting means to which said suction cups are secured, a plurality of suction conduits, each of said tubes being connected to said suction conduits, one outside tube of said plurality of tubes being rigidly connected to said supporting frame and the remaining ones of said plurality of tubes being mounted for displacement on said frame and including free tubes and slidably connected tubes; slidably mounted members on said frame to which said slidably connected tubes are connected for movement therewith, said plurality of tubes arranged after said rigidly connected outside tube alternating successively between free and slidably connected tubes and a plurality of horizontally articulated levers connected in a zig-zag series and connecting said free tubes to said slidably connected tubes for guiding the movements of said free tubes.

5. Apparatus as defined in claim 4 further comprising a plate lying flat on said supporting frame and including a plurality of slots inclined with respect to a centerline thereof and a bearing portion, a vertical pin extending from the center portion of each of said lever guided free tubes and into a corresponding one of said inclined slots for suspending each of said free tubes from said plate; a setting lever which acts on said bearing portion as a consequence of which the plate is displaced and this, in turn, displaces the plurality of tubes and varies the spacing between them, as well as said suction cups.

6. Apparatus as defined in claim 5 further comprising a powered swivel arm which is connected to said lifting means and mounted laterally thereof and which carries said setting lever; supporting structure from which said swivel arm extends; whereby said swivel arm provides both reciprocating movements to the suction means between the transporting tray and the incubation trays and variation in the spacing of said suction cups via said setting lever.

7. Apparatus as defined in claim 6 wherein said supporting surface is provided with horizontal guide rails thereon.

8. An arrangement as defined in claim 1 wherein said means for grasping comprise a plurality of grasping elements one for each egg to be lifted, arranged in a plurality of parallel rows, and said means for staggering comprise: a supporting frame; a plurality of intermediate supports each carrying a respective row of said grasping elements, an outer one of said intermediate supports being immovably attached to said frame; a plurality of slide members each slidably mounted on said frame for movement transverse to the direction in which said grasping element rows extend, said slide members being connected only to every other intermediate support after said outer one of said intermediate supports; means for moving said slide members for moving the intermediate supports connected to said slide members toward and away from one of said intermediate supports; and a plurality of horizontally articulated levers connecting the remaining ones of said intermediate supports to said one of said intermediate supports and to said intermediate supports to which said slide members are connected, whereby movement of said slide members causes said levers to pivot so as to move said remaining intermediate supports in the direction of said rows of grasping elements.

9. Apparatus for handling eggs comprising, in combination:

(a) a horizontal supporting table adapted to receive thereon first egg carrying means in which the eggs are positioned in mutually perpendicular rows;

(b) an inclined supporting surface adapted to receive second egg carrying means and located to one side of said supporting table;

(c) lifting means mounted for reciprocating movement in a vertical plane and positioned over said supporting table and surface, said lifting means including:

(1) a plurality of suction cups for grasping the eggs in the first carrying means, the number of suction cups corresponding to the number of egg accommodating recesses provided in the first carrying means being used, (2) means mounted for conveying eggs from the first to the second carrying means along an arcuate path, and (3) means for staggering the eggs while the same are being conveyed in consequence of which the eggs are tightly packed in said second carrying means when released by said lifting means, said means for staggering including: a supporting frame, a plurality of tubes extending in the direction of the arcuate path followed by said means for conveying, said suction cups being secured to said tubes, a plurality of suction conduits to which said tubes are connected, one outside tube of said plurality of tubes being rigidly connected to said supporting frame and the remaining ones of said plurality of tubes being mounted for displacement on said frame and including free tubes alternating with slidably connected tubes, slidably mounted members on said frame to which said slidably connected tubes are connected for movement therewith, said plurality of tubes arranged after said rigidly connected outside tube alternating successively between free and slidably connected tubes, a plurality of horizontally articulated levers connected in a zig-zag series and connecting said free tubes to said other tubes for guiding the movements of said free tubes, a plate lying flat on said supporting frame and provided with a bearing portion and a plurality of slots inclined with respect to a center line thereof, a vertical pin extending from the center portion of each of said lever guided free tubes and into a corresponding one of said inclined slots for suspending each of said free tubes from said plate, and a setting lever which acts on said bearing portion as a consequence of which said plate is displaced so as to, in turn, displace said plurality of tubes and vary the spacing between them, as well as between said suction cups;

(d) a powered swivel arm connected to said lifting means and mounted laterally thereof, said swivel arm carrying said setting lever, whereby movement of said swivel arm provides both reciprocating movements to said suction cups between the first and second egg carrying means and also provides variation in the spacing between said suction cups through the action of said setting lever;

(e) a supporting structure from which said swivel arm extends; and (f) horizontal guide rails mounted on said supporting surface and first conveyor chains disposed parallel to said guide rails for successively introducing the second carrying means into the plane of movement of said lifting means.

10. Apparatus as defined in claim 9 wherein said supporting surface is provided with additional guide rails and conveyor chains in the plane of movement of said lifting means for displacing the second carrying means upwards and downwards below the lifting means as the second carrying means are being filled.

11. Apparatus as defined in claim 10 further comprising control means for synchronizing the movements of all the moving parts of the apparatus according to a predetermined sequence.

References Cited

UNITED STATES PATENTS 2,903,290 9/1959 Morris
2,969,633 1/1961 Archer.
3,272,360 9/1966 Schoot.

ROBERT G. SHERIDAN, Primary Examiner

G. F. ABRAHAM, Assistant Examiner

U.S. Cl. X.R.

214—301, 309; 294—87